United States Patent
Shahin

(10) Patent No.: US 12,215,748 B2
(45) Date of Patent: Feb. 4, 2025

(54) BRAKE PAD SPRING AND DISK BRAKE SYSTEM

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Gyeonggi-Do (KR)

( * ) Notice: Subject to any disclaimer, the term of this patent is extended or adjusted under 35 U.S.C. 154(b) by 344 days.

(21) Appl. No.: 17/725,553

(22) Filed: Apr. 21, 2022

(65) Prior Publication Data

US 2023/0038973 A1  Feb. 9, 2023

(30) Foreign Application Priority Data

Aug. 3, 2021  (DE) .................. 10 2021 208 405.2

(51) Int. Cl.
*F16D 65/097* (2006.01)
*F16D 55/22* (2006.01)
(Continued)

(52) U.S. Cl.
CPC ........ *F16D 65/0978* (2013.01); *F16D 55/226* (2013.01); *F16D 2127/02* (2013.01)

(58) Field of Classification Search
CPC ............. F16D 65/0977; F16D 65/0978; F16D 55/226; F16D 2127/02
(Continued)

(56) References Cited

U.S. PATENT DOCUMENTS 6,250,436 B1 * 6/2001 Oikawa ................. B60T 13/741
188/162
7,201,257 B2 * 4/2007 Nakajima ........... F16D 65/0972
188/73.31
(Continued)

FOREIGN PATENT DOCUMENTS

DE  10 2004 050 138  6/2005
EP  1 933 054  6/2008
(Continued)

OTHER PUBLICATIONS

Office Action dated Apr. 8, 2022 for German Patent Application No. 10 2021 208 405.2 and its English machine translation by Google Translate.
(Continued)

*Primary Examiner* — Thomas J Williams
(74) *Attorney, Agent, or Firm* — WOMBLE BOND DICKINSON (US) LLP

(57) ABSTRACT

The invention relates to a brake pad spring (1) for at least one brake pad (2), in particular for two brake pads, wherein the brake bad spring (1) comprises, for each of the at least one brake pad (2), two opposing walls (9, 10), configured for receiving a portion of a backplate (3) of the respective brake pad (2) therebetween, and for guiding the respective brake pad (2) between a non-braking position (A) in which the respective brake pad (2) is located at a first section (S1) of the opposing walls (9, 10), and a braking position (B) in which the brake pad (2) is located at a second section (S2) of the opposing walls (9, 10). At least a portion of at least one of the two opposing walls (9,10) is elastically movable and the two opposing walls (9, 10), at least sectionally, have a non-vanishing angle with respect to each other, a distance between the two opposing walls (9, 10) diminishing from the first section (S1) towards the second section (S2), in order to create a return spring effect for the respective brake pad (2), (Continued)

from the braking position (B) towards the non-braking position (A). The invention also relates to a disk brake system, comprising a brake disk (5) and a brake pad spring (1) which is mounted on a carrier (7).

17 Claims, 9 Drawing Sheets

(51) Int. Cl.
   *F16D 55/226* (2006.01)
   *F16D 127/02* (2012.01)
(58) Field of Classification Search
   USPC .................................................... 188/73.38
   See application file for complete search history.

(56) References Cited

U.S. PATENT DOCUMENTS

| | | | |
|---|---|---|---|
| 2016/0076611 A1* | 3/2016 | Boyle | F16D 65/0972 188/72.3 |
| 2016/0091038 A1* | 3/2016 | Asahi | F16D 65/0977 188/73.38 |
| 2018/0216680 A1* | 8/2018 | Merlo | B62L 1/005 |
| 2023/0038973 A1* | 2/2023 | Shahin | F16D 65/0972 |

FOREIGN PATENT DOCUMENTS

| | | | | |
|---|---|---|---|---|
| JP | 2016-050601 | | 4/2016 | |
| KR | 19980042338 U | * | 9/1998 | ........... F16D 55/226 |
| KR | 10-2016-0141435 | | 12/2016 | |
| KR | 10-2017-0040494 | | 4/2017 | |
| KR | 10-2018-0131159 | | 12/2018 | |
| KR | 10-2020-0048210 | | 5/2020 | |
| WO | WO-2016198386 A1 | * | 12/2016 | .............. B60T 1/065 |

OTHER PUBLICATIONS

Office Action dated Feb. 15, 2024 and for Korean Patent Application No. 10-2022-0091051 and its English translation from Global Dossier.

* cited by examiner

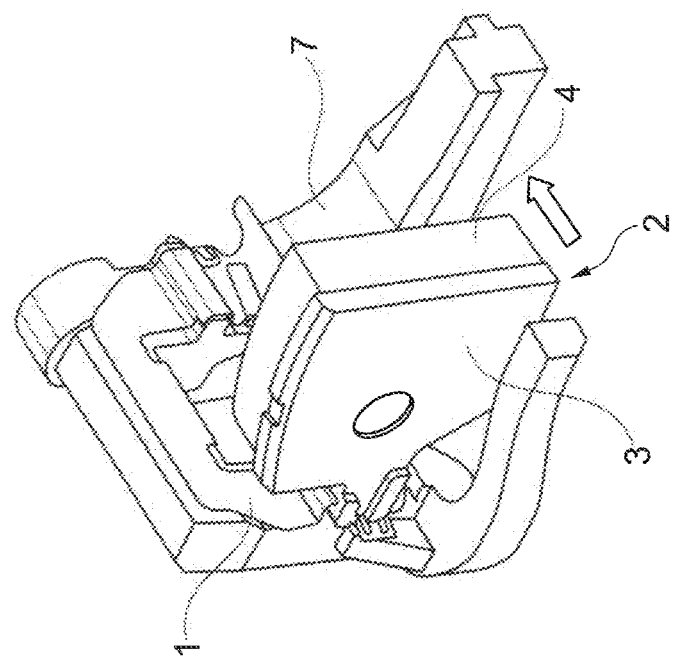
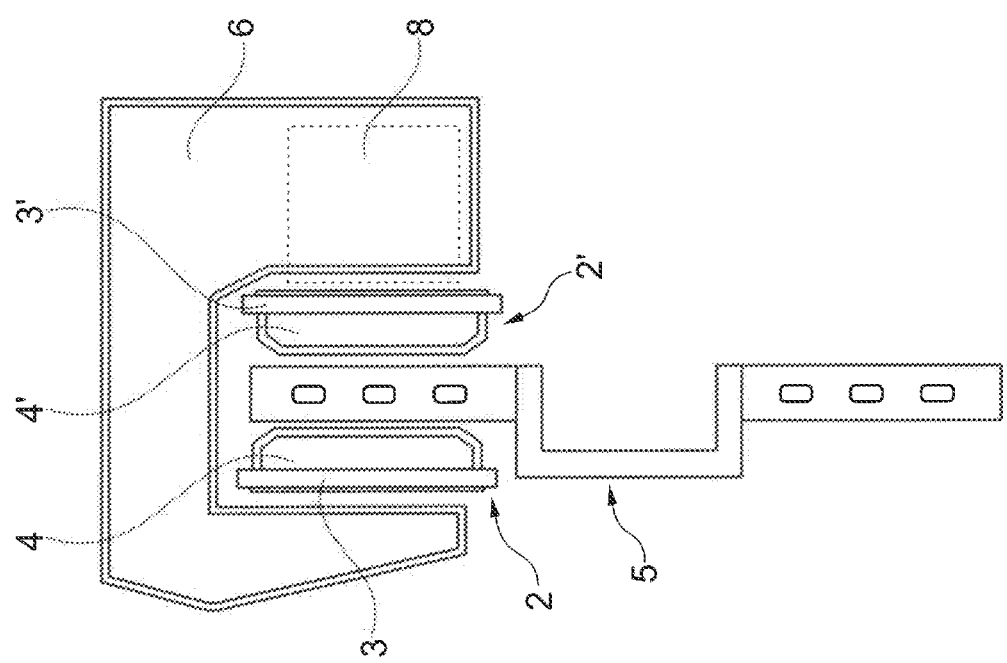
Fig. 1b
Fig. 1a

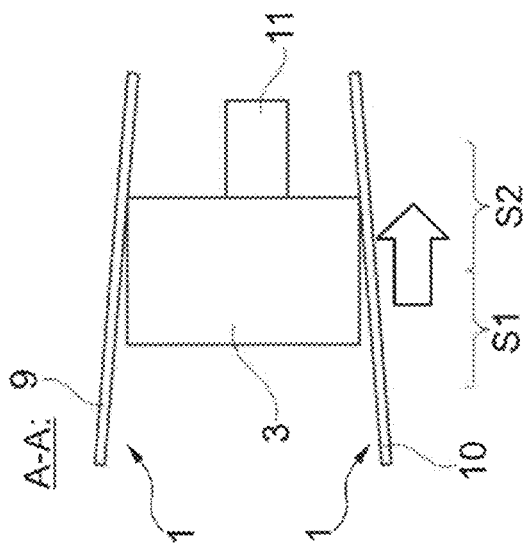
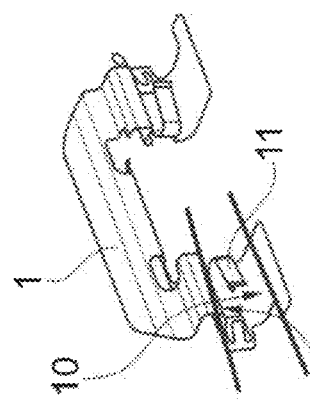
Fig. 2d
Fig. 2e
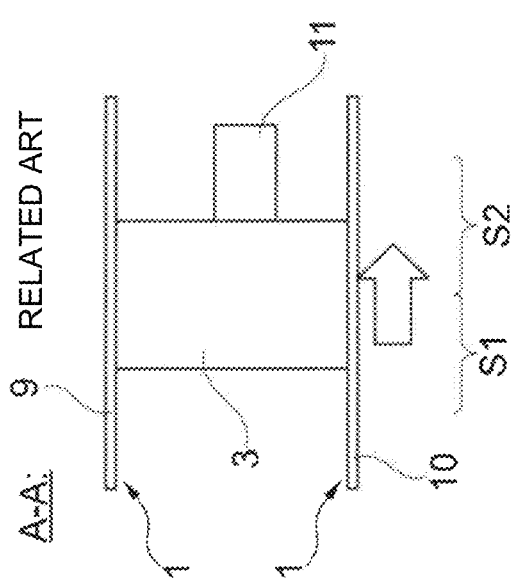
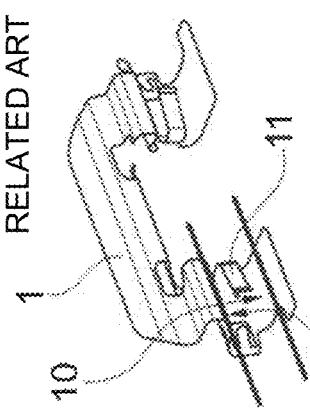
Fig. 2b RELATED ART
Fig. 2c RELATED ART
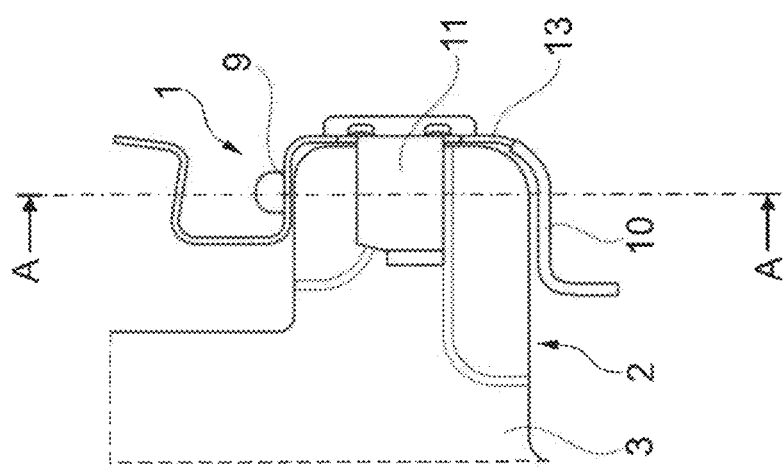
Fig. 2a

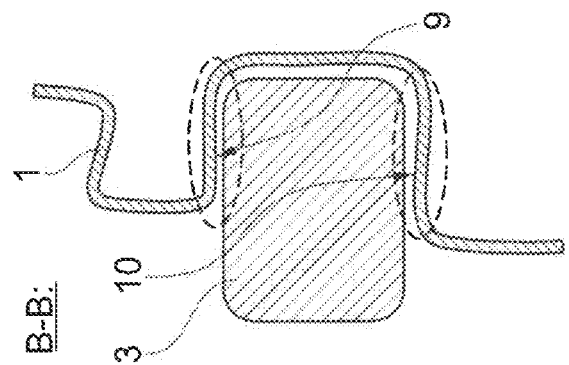
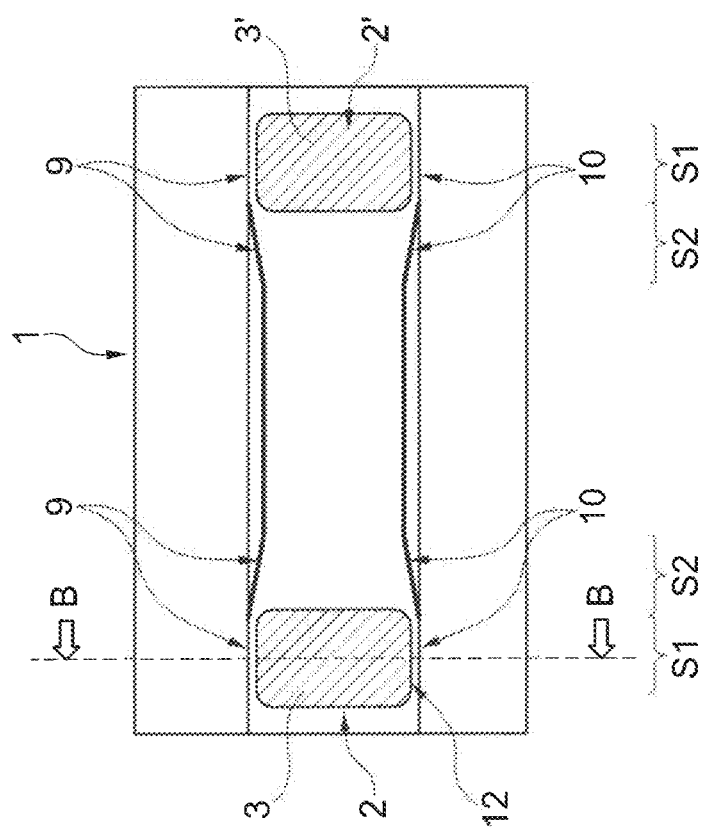

BRAKE PAD SPRING AND DISK BRAKE SYSTEM

The invention is in the field of mechanical engineering, in particular in the field of vehicle brakes.

In disk brake systems, reduction of undesired drag during driving, i.e. when the brakes are not applied, has long been the subject of research and development. Previous solutions have not lead to fully satisfying results. They have not been able to achieve "zero drag torque" and further drawbacks include for instance long pedal travel, increased noise/vibration/harshness (NVH), or an undesired temperature dependence that makes it difficult to achieve consistently good results for all driving situations.

According to the prior art, brake pad springs are sometimes provided for holding the brake pads and guiding them between a braking and a non-braking position. The brake pad springs are typically mounted on a carrier, such as the caliper bracket, and have a recessed portion for receiving part of a backplate of the brake pad. The backplate slides within this recessed portion. These brake pad springs typically include a retraction spring for each of the brake pads. During braking, the backplate presses against the retraction spring and when the brakes are loosened, the retraction spring helps to push the brake pads back into the initial non-braking position. The retraction spring is a fault-prone component that can break and make assembly difficult.

In view of the prior art, it is an objective of the present invention to solve at least some of the problems indicated above and/or provide a robust solution for reducing drag torque.

This is achieved by a brake pad spring according to claim 1. It is also achieved by a disk brake system according to claim 13. Advantageous embodiments are shown in the dependent claims and in the following description and the figures.

Accordingly, a brake pad spring is suggested for at least one brake pad, in particular for two brake pads. The brake bad spring comprises, for each of the at least one brake pad, two opposing walls.

The brake pad spring is configured for receiving a portion of a backplate of the respective brake pad between the two opposing walls, and for guiding the respective brake pad.

The brake pad spring guides the brake pad between a non-braking position in which the respective brake pad is located at a first section of the opposing walls, and a braking position in which the brake pad is located at a second section of the opposing walls.

At least a portion of at least one of the two opposing walls is elastically movable. The two opposing walls, at least sectionally, have a non-vanishing angle with respect to each other, a distance between the two opposing walls diminishing from the first section towards the second section. This creates a return spring effect for the respective brake pad, from the braking position towards the non-braking position.

Correspondingly, the opposing walls may constitute sliding surfaces for the brake pad. The portion of the brake pad that is provided between the opposing walls abuts against both of the two opposing walls at least when in the braking-position. A back-movement into the non-braking position is effected and/or aided by the elastic movability of at least one of the walls. In particular, at least one of the walls may be elastic. The elasticity or elastic movability is provided so that at least one of the walls can be elastically moved outwards when the brake pad is in the braking position, the backplate pushing at least one of the walls outward during braking. Because of the elasticity or elastic movability of the at least one wall, said at least one wall returns to its original position after the brake pressure is released, thus pushing the brake pad back and away from the brake disk.

The restoring force effected by the interaction of the two opposing walls with the brake pad typically acts at least predominately on the edges of the backplate instead of one of the main surfaces of the backplate. In contrast, a typical retraction spring according to the prior art would act on the main surface.

Diminishing of the distance of the two opposing walls from the first section towards the second section may be obtained by providing an angle for at least a portion of a circumferentially outer wall of the two opposing walls and/or by providing an angle for at least a portion of a circumferentially inner wall of the two opposing walls. The decreasing distance and non-vanishing angle may be obtained by having flat walls arranged at a constant angle. Alternatively, at least one of the walls may have a bend or a kink, resulting in an angle being provided sectionally. The non-vanishing angle of the two opposing walls may be provided by including a slope for a first wall of the two opposing walls and/or by providing a slope for the second wall of the two opposing walls. The slope may be defined for instance with respect to inner and/or outer edges of the brake pad spring. Specifically, for example, in order to reduce the distance between the walls in the second section, one of the walls or both of the walls may be arranged at an angle and/or may be curved and/or may have an increased thickness and/or may contain additional material.

The disk brake system envisioned herein is a disk brake system comprising the brake pad spring described herein. The disk brake system may comprise a brake disk and a brake pad spring, in particular the brake pad spring according to any of the embodiments shown herein, the brake pad spring being mounted on a carrier. The carrier may for instance be a caliper bracket of the brake system.

A portion of a backplate of a brake pad is received between two opposing walls of the brake pad spring, for guiding the brake pad between a non-braking position in which the brake pad is located at a first section of the opposing walls and away from the brake disk, and a braking position in which the brake pad is located at a second section of the opposing walls and wherein the brake pad abuts against the brake disk.

At least a portion of at least one of the two opposing walls is elastically movable, and the two opposing walls at least sectionally have a non-vanishing angle with respect to each other, a distance between the two opposing walls diminishing from the first section towards the second section, so that the portion of the back plate that is received between the two opposing walls engages with the two opposing walls at the second section to create a return spring effect for the brake pad, effecting or aiding movement of the brake pad from the braking position towards the non-braking position.

It should be noted that while the brake pad spring develops the return spring effect according to the invention in interaction with the brake pad, the properties and advantages according to the invention can readily be seen on the brake pad spring itself, for instance by inspecting the opposing walls and observing an angle or a distance between the opposing walls.

A distance between the two opposing walls may be chosen in accordance with the dimensions of the backplate of the brake pad. A distance between the two opposing walls in the first section may be for instance at least 8 mm and/or at most 15 mm. The distance between the two opposing walls may diminish by at least 5% and/or by at most 15%, from the first section to the second section. Additionally or alternatively, the distance between the two opposing walls may diminish by at least 1 mm or by at least 2 mm and/or by at most 4 mm or by at most 3 mm. Additionally or alternatively, an angle between the two opposing walls may be at least 5 degrees and/or at most 8 degrees. These angles may in particular be provided along an entire length of the walls, for instance when both walls are configured as flat walls arranged at a constant angle. Alternatively, angles of this type may be provided in a configuration where at least one of the walls has a kink, the angle being provided only for a portion of the wall.

In possible configurations, at least one of the two opposing walls is curved. I.e., at least one of the walls has a bend. A curved wall will have a non-constant angle with regard to the other wall, along a length of the bend.

The brake pad spring may be designed as a stamped and/or bent metal part.

The brake pad spring may be an additively manufactured part.

The brake pad spring may be a singly connected one-piece component.

The brake pad spring may for instance comprise metal, in particular steel and/or aluminum and/or copper. In particular, the brake pad spring may comprise or consist of sheet metal.

The brake pad spring may comprise a polymer.

At least a portion of the two opposing walls, which portion is configured for engaging with the respective brake pad, may have a coating, such as a Polytetrafluorethylen coating.

At least one of the two opposing walls may comprise two or more sections having different materials and/or different stiffness. The materials and/or stiffness may differ between the first section and the second section, and/or they may differ within the first section and/or within the second section.

For instance, a thickness of the two opposing walls may differ between the first section and the second section. The thickness may increase or decrease from the first section towards the second section and/or within the first section and/or the second section. In particular the difference may change by at least 0.1 mm and/or by at most 0.3 mm. A thickness in the first section and/or in the second section may for instance be at least 0.4 mm and/or at most 1 mm.

The brake pad spring may be devoid of a retraction spring. Thereby, improved pedal feel and/or facilitated mounting of the brake pad spring and/or the brake pads may be achieved.

The brake pad spring may be configured for guiding two brake pads, namely an inner brake pad and an outer brake pad. The brake bad spring may comprise two opposing walls, for each of the two brake pads, configured for receiving a portion of a backplate of the respective brake pad therebetween.

Therein, for the inner brake pad and/or for the outer brake pad, at least a portion of at least one of the two opposing walls may be elastically movable. Furthermore, for the inner brake pad and/or for the outer brake pad, the two opposing walls may have a non-vanishing angle with respect to each other, a distance between the two opposing walls diminishing from a first section towards where the respective brake pad is located in a non-braking state, towards a second section, where the respective brake pad is located during braking, in order to create a return spring effect for the respective brake pad, from the braking position towards the non-braking position.

In the brake system, a clearance between the brake disk and a friction layer of the brake pad in the non-braking position may for instance be at least 0.05 mm and/or at most 0.12 mm. A stroke may be for instance at least 0.05 mm and/or at most 0.12 mm.

The disk brake system may further comprise a second brake pad spring, opposite to the brake pad spring mentioned above (which constitutes a first brake pad spring, in this case). The second brake pad spring is for holding a second portion of the backplate, opposite to the portion of the backplate of the respective brake pad that is received between the two opposing walls of the first brake pad spring, and for guiding the brake pad in cooperation with the first brake pad spring.

Exemplary embodiments of the invention will now be explained with reference to the Figures.

Therein,

FIGS. 1a and b show parts of a brake system,

FIG. 2a shows a brake pad spring and a portion of a backplate of a brake pad mounted within the brake pad spring, FIG. 2b schematically illustrates a position of a brake pad within a brake pad spring according to the prior art, FIG. 2c shows a perspective view of a brake pad spring according to the prior art, FIG. 2d schematically illustrates a position of a brake pad within a brake pad spring according to the invention, FIG. 2e shows a perspective view of a brake pad spring according to the invention, FIG. 3a schematically illustrates a position of a brake pad within a brake pad spring according to the invention in a non-braking condition, FIG. 3b shows a brake system in a non-braking condition FIG. 3c schematically illustrates a position of a brake pad within a brake pad spring according to the invention in a braking condition, FIG. 3d shows a brake system in a braking condition, FIG. 4a schematically shows a brake pad spring according to the prior art with two brake pads, FIG. 4b shows a cut indicated in FIG. 4a, FIG. 5a schematically shows a brake pad spring according to the invention with two brake pads, FIG. 5b shows a cut indicated in FIG. 5b, FIGS. 5c-g show further embodiments of the brake pad spring according to the invention, FIG. 6a schematically shows a brake pad spring according to the invention with two brake pads, and FIGS. 6b-g illustrate different embodiments of a wall of the brake pad spring in an enlarged view.

FIG. 1a shows a brake system having a brake disk 5 and two brake pads 2, 2' which are held by a caliper 6. The brake pads 2, 2' each have a backplate 3, 3' and a friction layer 4, 4'. The backplates 2, 2' are mounted on the caliper 6, as will be explained further in FIG. 1b. The caliper 6 comprises a piston 8 for pressing the brake pads 2 against the brake disk 5 during braking. After braking, the brake pads 2, 2' have to be retracted, away from the brake disk 5. Residual drag after braking should be avoided. Retraction of the brake pads 2, 2' is for instance at least in part achieved by an elasticity of the a seal of the piston 8.

FIG. 1b shows a caliper bracket 7 of the caliper 8 of FIG. 1a. A brake pad spring 1 is mounted on the caliper bracket 7. A lateral portion of the backplate 3 is received within a recessed portion of the brake pad spring 1. The brake pad 2 is thereby slidably arranged within said recessed portion and may be moved in the direction indicated by the arrow for braking. A second brake pad 2' can be mounted within the brake pad spring 1, opposite to the brake pad 2 shown in the figure. As will be explained further here below, the brake pad spring 1 has two opposing walls 9, 10 for each of the backplates 2, 2', the lateral portion of the respective backplate 2, 2' being arranged between those two opposing walls 9, 10.

FIG. 2a shows, in an enlarged view, part of the backplate 3 of the brake pad 2, including the lateral portion of the backplate 3 that is received within the brake pad spring 1. Thereby, FIG. 2a depicts a view onto an inner main surface of the backplate 2 which main surface faces the brake disk. The lateral portion is received within the recessed portion of the brake pad spring 1 and it is enclosed by a first wall 9, being the circumferentially outer wall, and a second wall 10, being the circumferentially inner wall, and by a lateral wall 13. The three walls 9, 10, 13 define the recessed portion of the brake pad spring 1. During braking, the brake pad slides between these walls 9, 10, 13, into and out of the paper plane. Specifically, when the brakes are applied, the brake pad 2 moves out of the paper plane, towards the viewer. A retraction spring 11 is arranged in such a manner that it is put under tension when the brake pad 2 moves out of the paper plane towards the viewer for braking. The retraction spring 11 pushes the brake pad 2 back into the non-braking position when the brake pressure is no longer applied. Retraction springs 11 can be disadvantageous. According to this application, alternative or additional means for pushing the brake pad 2 back into the non-braking position are envisioned, namely the walls 9, 10 are angled, as will be further described here below.

FIG. 2b shows a brake pad spring 1 according to the prior art, in the cut view A-A indicated in FIG. 2a. The two opposing walls 9, 10 are parallel to each other. When the brakes are applied, the brake pad moves in the direction indicated by the arrow, from a first section S1 to a second section S2, putting the retraction spring 11 under tension. The retraction spring 11 is required to move the brake pad 2 back into the original position, after braking.

FIG. 2c shows a perspective view of the brake pad according to the prior art (as shown in FIG. 2b). As indicated by the parallel lines, the opposing walls 9, 10 are parallel to each other.

FIG. 2d shows a brake pad according to the present invention, in the cut view A-A indicated in FIG. 2a. The brake pad spring has two opposing walls 9, 10 which are configured for receiving the portion of the backplate 3 of the respective brake pad 2 therebetween. The brake pad spring guides the respective brake pad 2 between a non-braking position in which the respective brake pad 2 is located at a first section S1 of the opposing walls 9, 10, and a braking position in which the brake pad 2 is located at a second section S2 of the opposing walls 9, 10. I.e., when the brakes are applied, the brake pad 2 and its backplate 3 move to the right, as indicated by the arrow.

At least a portion of at least one of the two opposing walls 9,10 is elastically movable. As can be seen from the FIG. 2d, the two opposing walls 9, 10 have a non-vanishing angle with respect to each other. A distance between the two opposing walls 9, 10 diminishes from the first section S1 towards the second section S2. Because of the diminishing distance, and because of the elasticity of at least one of the two opposing walls, the wall arrangement is put under tension when the brakes are applied and the brake pad moves to the right. This creates a return spring effect for the respective brake pad 2, from the braking position B towards the non-braking position A. As soon as the brakes are loosened, the opposing walls 9, 10 aid the retracting movement, from the right to the left. The retraction spring 11 is thus optional in such a setup.

FIG. 2e shows a perspective view of the brake pad according to the invention (as shown in FIG. 2d). As indicated by the non-parallel lines, the opposing walls 9, 10 are at a non-vanishing angle with respect to each other.

In the brake pad spring 1 shown in FIGS. 2d and 2e, the distance between the two opposing walls 9, 10 diminishes by between 5% and 15%. In absolute terms, a decrease in distance may for instance be between 1 and 4 mm or between 2 and 3 mm. An angle between the two opposing walls 9, 10 is between 5 and 8 degrees.

The brake pad spring 1 is a one-piece component that is designed as a stamped and bent metal part. The brake pad spring 1 is made of sheet metal and comprises steel and/or aluminum and/or copper.

At least a portion of the two opposing walls 9, 10 that is configured for engaging with the brake pad 2 has a coating, in particular a Polytetrafluorethylen coating.

FIGS. 3a through 3d once again explain the function of the brake pad spring 1 according to the invention. FIGS. 3a and 3b show parts of the brake system in a non-braking condition A and FIGS. 3c and 3d show the same parts in a braking condition B. FIGS. 3a and 3c show the cut views previously used for FIGS. 2b and 2d. FIGS. 3b and 3d show representations where the brake pads 2 can be seen in relation to the brake disk 5.

In the non-braking condition (FIGS. 3a and 3b), the portion of the backplate 3 that resides between the two opposing walls 9, 10 is located at a first section S1 of the two opposing walls 9, 10 (cf. FIG. 3a). Within said first section S1, the distance between the two opposing walls 9, 10 is such that the backplate 3 can be received therebetween without deformation of the two opposing walls. A clearance between the brake disk 5 and the friction layer 4 of the brake pad 2 in the non-braking position A is between 0.05 mm and 0.12 mm. If the brakes are applied, the brake pad 2 moves in the direction indicated by the arrow in FIG. 3a.

In the braking condition (FIGS. 3c and 3d), the portion of the backplate 3 that resides between the two opposing walls 9, 10 is pushed into a second section S2 of the two opposing walls 9, 10 (cf. FIG. 3c). The friction layer 4 is then pressed onto the brake disk 5 (cf. FIG. 3d). As can be seen from FIG. 3c, in the braking position, the portion of the backplate 3 that resides between the two opposing walls 9, 10 pushes against the two walls 9, 10, elastically moving the walls 9, 10 away from each other. Because of the elastic movability of the walls 9, 10, they give way to the backplate 3. Once the brake pressure is no longer applied, the elasticity provided for the two opposing walls 9, 10 forces the two walls 9, 10 back towards each other, effecting a pressure on the backplate 3, and pushing the backplate 3 to the left and away from the brake disk, as indicated by the arrow. This restoring force is typically aided by an elasticity of a seal of the piston.

It should be noted that FIGS. 3a and 3c are an exaggerated depiction: Typically, the stroke of the brake pad 2 (and thus the left-right-movement of the brake pad 2 as shown in FIGS. 3a and 3c) is small. It should be noted that, according to the invention, it is not necessary for the brake pad 2 to be completely displaced out of section S1 and into section S2 during braking. It is only required that the brake pad is displaced such that it reaches at least partially into section S2 where the distance between the walls is reduced.

As can be seen from FIGS. 3a and 3b, the brake pad spring 1 is devoid of a retraction spring 11.

FIG. 4a shows a brake pad spring 1 according to the prior art, with two brake pads 2, 2'. The brake pad spring 1 comprises a circumferentially outer first wall 9 and a circumferentially inner second wall 10. Both walls are even and they are arranged in parallel to each other, forming parallel sliding surfaces for the backplates 3, 3' of the brake pads 2, 2'. Sliding faces 12 of the backplates 3, 3' of the brake pads 2, 2' slide along the walls 9, 10 during a braking process. When the brakes are applied, both brake pads 2, 2' move inward. There is no retraction effect caused by the walls 9, 10.

FIG. 4b shows the brake pad spring 1 according to the prior art in a cut view B-B, as indicated in FIG. 4a. When the brakes are applied, the back plate 3 moves towards the viewer, sliding between upper first wall 9 and lower second wall 10 of the brake pad spring 1 without elastically deforming or moving the walls 9, 10.

FIG. 5a shows a brake pad spring 1 according to the invention, with two brake pads 2, 2'. The brake pad spring 1 comprises a circumferentially outer first wall 9 and a circumferentially inner second wall 10. The brake pad spring 1 is configured for guiding the two brake pads 2, 2'. The two opposing walls 9, 10 are provided for each of the two brake pads 2, 2'. The two opposing walls 9, 10 are configured for receiving a portion of a backplates 3, 3' of the brake pads 2, 2' therebetween.

Sliding faces 12 of the backplates 3, 3' of the brake pads 2, 2' slide along the walls 9, 10 during a braking process. When the brakes are applied, both brake pads 2, 2' move inward, in each case from a section S1 towards a section S2 of the walls 9, 10. Both walls 9, 10 comprise a kink for each of the brake pads 2. Due to the kink, the walls are sectionally at a non-vanishing angle with respect to each other, and a distance between the upper wall 9 and the lower wall 10 is reduced in section S2, as compared to section S1. When the brake pad 2 moves to section S2, the walls 9, 10 are elastically deformed and pushed away from each other by the brake pad 2, resulting in a spring tension that builds up within the walls 9, 10. After the brake pressure is released, the back movement of both brake pads 2, 2' from their respective section S2 to their respective section S1 is aided by the force effected by the walls 9, 10 which strive to return to their original state due to their elasticity. There is thus a retraction effect caused by the walls 9, 10.

In the case shown in FIG. 5a, the upper wall 9 and the lower wall 10 each have a connected middle section, which is arranged centrally between the two brake pads 2, 2', and which, in a neutral position, is bent inwardly with respect to remaining outer sections in order to achieve the reduction in distance between the two walls for the second sections S2. The connected middle sections represent elastically movable parts of the walls 9, 10. The elastically movable middle sections form centrally connected spring arrangements, causing a retraction effect for both brake pads 2. As will be explained below, in the context of FIGS. 5c through 5g, different setups may be chosen for the elastically movable parts. I.e., different types of spring arrangements may be formed by way of the walls 9, 10, such as non-connected springs, single-sided springs acting on only one of the brake pads 2, 2', or spring arrangements on only one of the walls 9, 10.

FIG. 5b shows the brake pad spring 1 according to the invention in a cut view B-B, as indicated in FIG. 5a. When the brakes are applied, the back plate 3 moves towards the viewer, sliding between upper first wall 9 and lower second wall 10 of the brake pad spring 1, and pushing the walls apart.

FIG. 5c shows a centrally connected spring arrangement for the brake pad spring 1 according to the invention, similar to that of FIG. 5a. An elastically movable part is provided only on the circumferentially outer first wall 9, wherein the circumferentially inner second wall 10 is even. The spring effect caused by the brake pad spring 1 is generated by elastic movability of the central wall section of the first wall 9. The spring effect acts on both brake pads 2, 2'.

FIG. 5d shows a spring arrangement for the brake pad spring 1 according to the invention. Each wall 9, 10, comprises two separate elastically movable parts, one for each brake pad 2, 2'.

FIG. 5e shows a spring arrangement for the brake pad spring 1 according to the invention. The top wall 9 comprises two separate elastically movable parts, one for each brake pad 2, 2'. The bottom wall 10 is even.

FIG. 5f shows a spring arrangement for the brake pad spring 1 according to the invention. Both walls 9, 10 comprise elastically movable parts for, in each case, only one of the brake pads. This way, retraction of only one of the brake pads is aided by the elasticity provided for the walls 9, 10. This may be done for only the inner brake pad 2' or for only the outer brake pad 2.

FIG. 5g exemplarily illustrates different versions of the elastically movable part. On the left, for the first brake pad 2 and thus the first backplate 3, the upper wall 9 has an angled portion and the lower wall 10 has an angled portion. They differ from one another in both angle and position. The angled portion of the upper wall is located further inward and the angled portion of the lower wall extends into the first section S1. The angled portion of the lower wall 10 has a steeper angle than the angled portion of the upper wall 9.

On the right, for the second brake pad 2' and the second backplate 3', the upper wall 9 and the lower wall 10 also each have an angled portion. The upper wall 9 has an increased thickness in the second section S2. The lower wall 10 comprises an elastically movable portion extending within section S2, which has an increased thickness as compared to the first section S1.

It is understood that the different variants of FIG. 5g, and all of the embodiments and variants of FIGS. 5a through 5f may be combined with one-another. They can also be combined with the embodiments shown in FIGS. 6a through 6g.

FIG. 6a shows once again the brake pad spring 1 according to the invention, having elastically movable parts for both walls 9, 10 and, in each case, for both brake pads 2, 2'. FIG. 6a shall serve as an overview: A circled selection of FIG. 6a comprises the first section S1 and the second section S2 for the upper wall 9, for one of the brake pads. Within the circled area, the upper wall 9 comprises a bend or kink in order to achieve the sectionally non-vanishing angle between the two walls 9, 10 and the reduced distance between the walls 9, 10 in section S2. The circled section is displayed in an enlarged manner in FIGS. 6b through 6g, illustrating different options for providing said kink or bend and reduction in distance. It is understood that the options shown in FIGS. 6b through 6g may also be used for non-connected movable elements as shown in FIGS. 5d through 5f, for example.

FIG. 6b illustrates the wall 9 having a kink and having a thickness that differs between the first S1 and the second section S2, the thickness being decreased in the second section by between 0.1 and 0.3 mm. The elastic movability may be due to an elasticity of the thinner portion of the wall 9, which thinner portion extends within section S2. In that case, the thinner portion of the wall represents at least part of the elastically movable portion of the upper wall 9. It is also possible that both the thicker and the thinner portion of the wall are elastic and/or elastically mounted, in which case they both pertain to the elastically movable portion.

FIG. 6c illustrates the wall 9 having a kink and having a thickness that differs between the first and the second section, the thickness being decreased in the second section. Furthermore, in the case of FIG. 6c, the material of the angled thinner portion is different from the material of the ticker portion extending within the first section S1. A brake pad spring 1 of this type, having two or more materials, may be produced by additive manufacturing to form a singly connected piece. The different sections of the brake pad spring 1 may comprise metals, in particular steel and/or aluminum and/or copper, and/or polymers.

FIG. 6d illustrates the wall 9 having a kink and having a thickness that differs between the first and the second section, the thickness being decreased in the second section. The angled thinner portion of the wall 9 comprises three different materials, having different stiffness and elasticity from one another. The materials may be chosen to achieve a constant linear stiffness value and/or to ensure independence of wear.

The different sections of the brake pad spring 1 may comprise metals, in particular steel and/or aluminum and/or copper, and/or polymers.

Figure 3A:
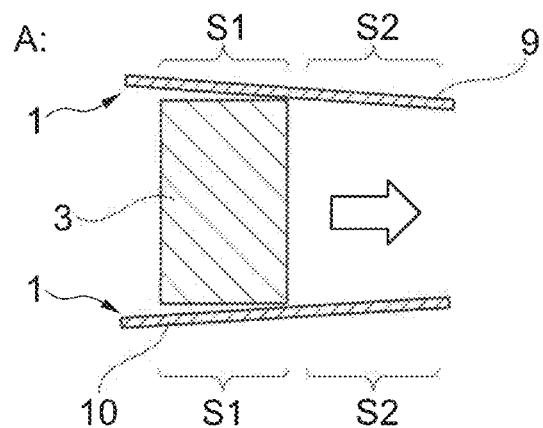
Figure 3C:
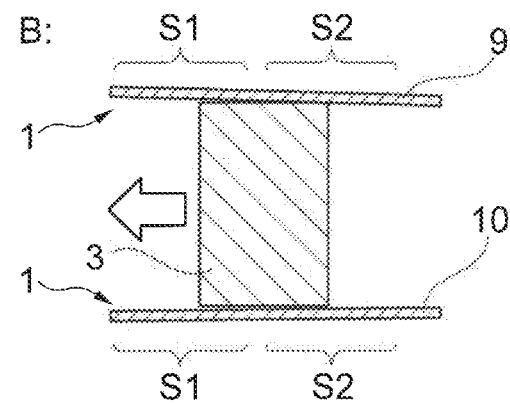
Figure 3B:
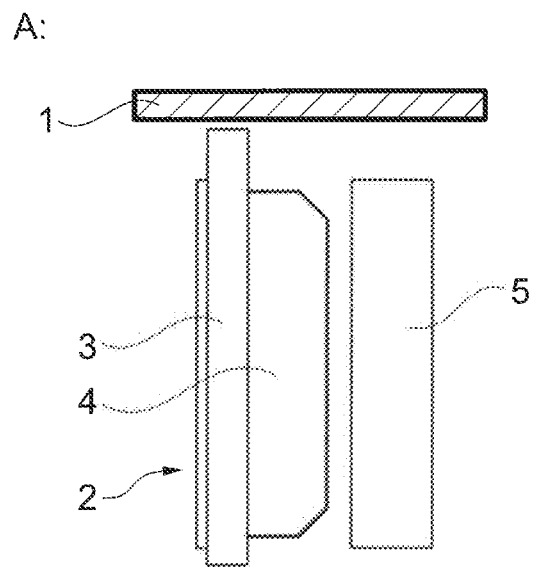
Figure 3D:
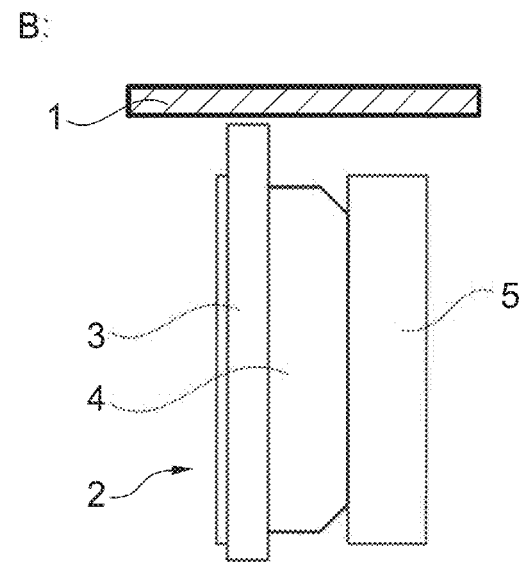
Figure 4B:
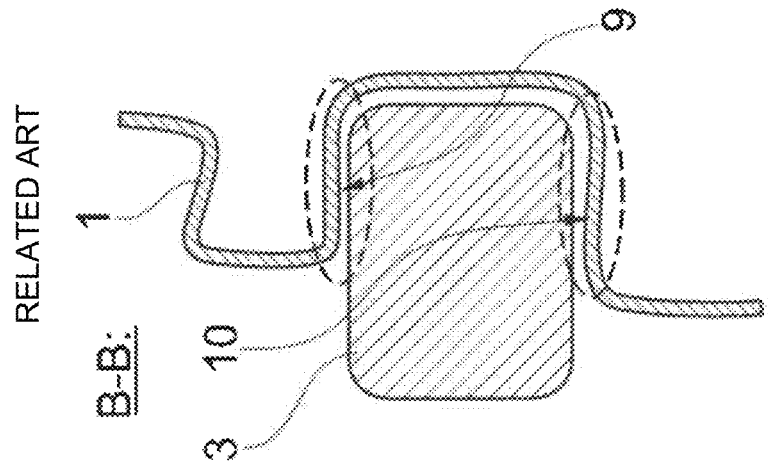
Figure 4A:
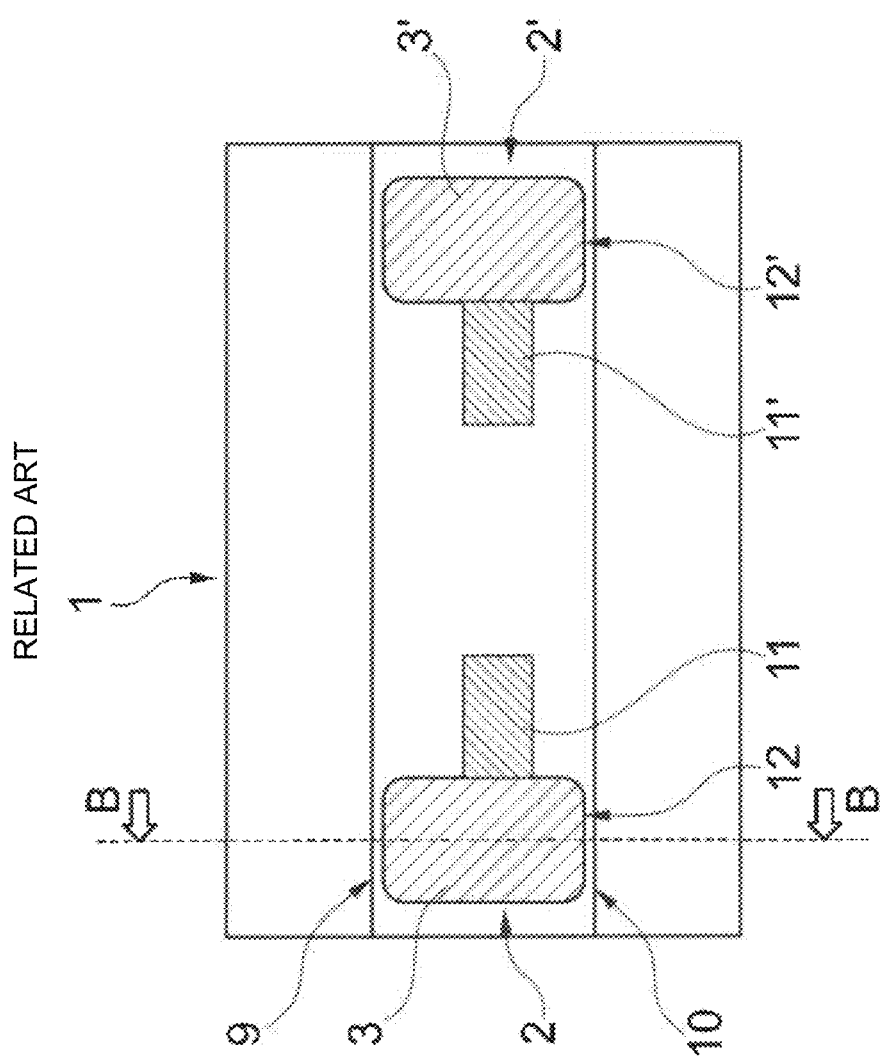
Figure 5C:
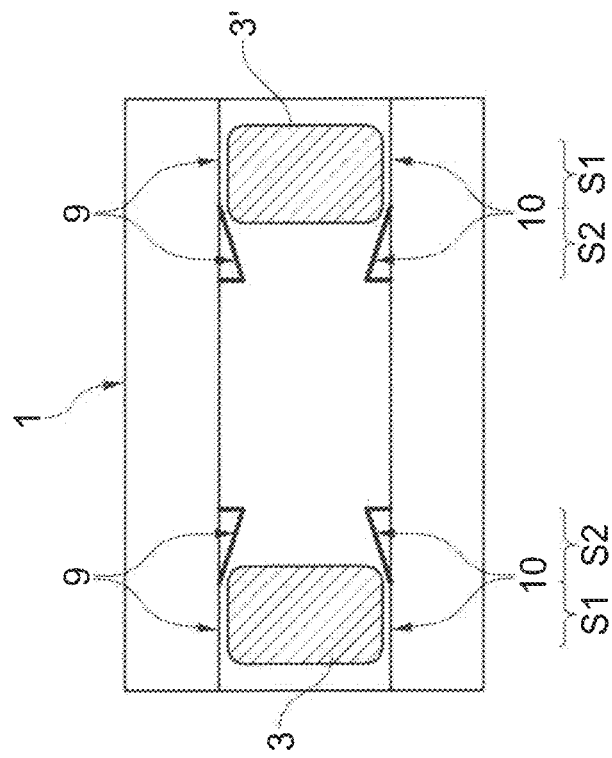
Figure 5D:
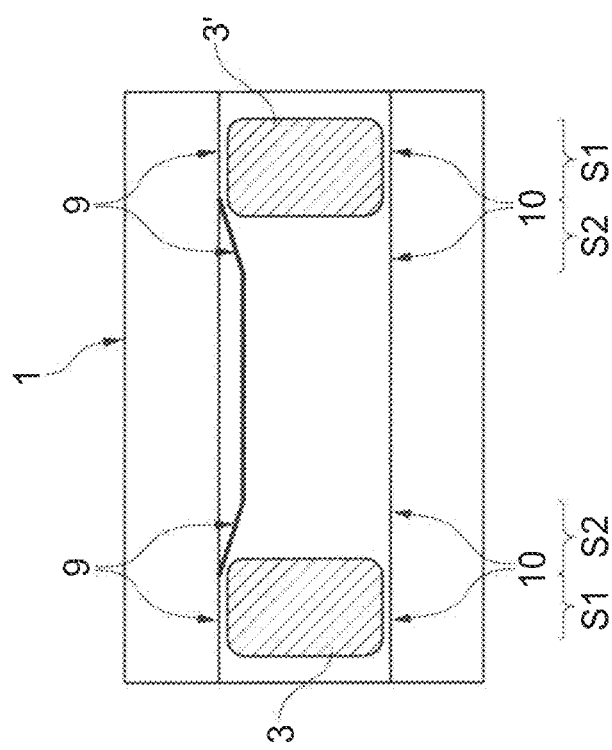
Figure 5F:
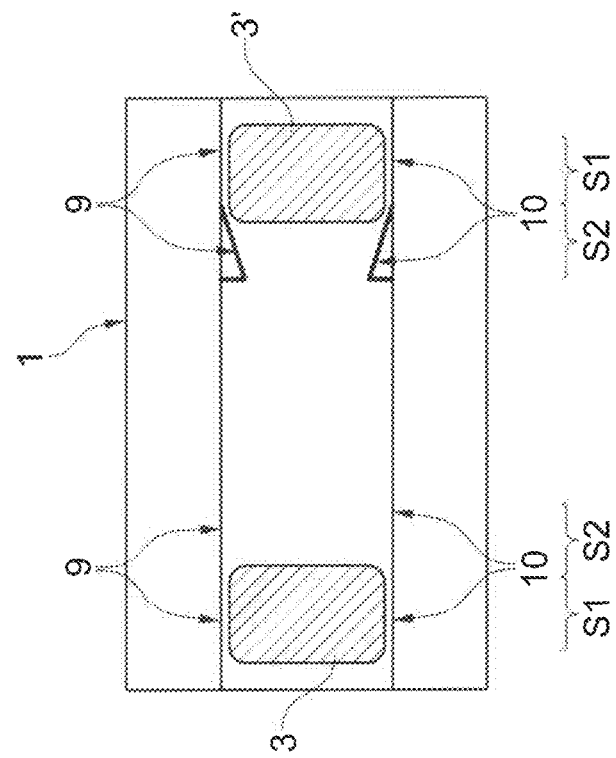
Figure 5E:
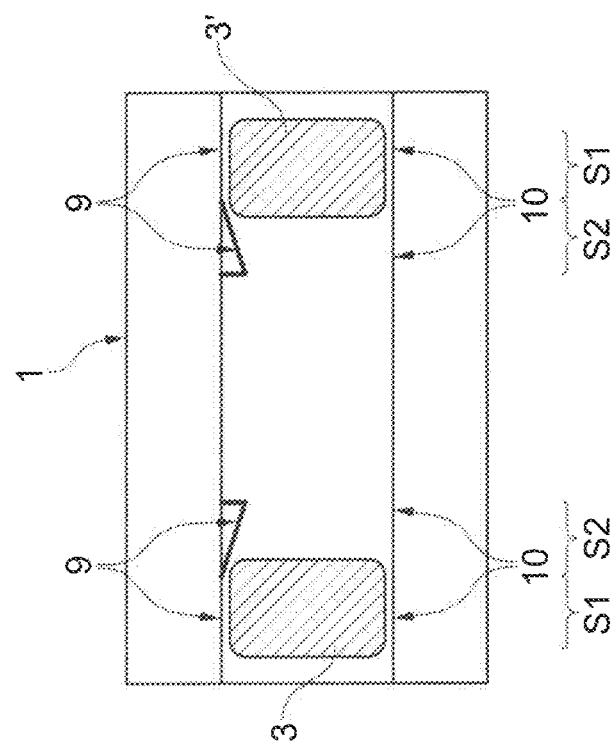
Figure 5G:
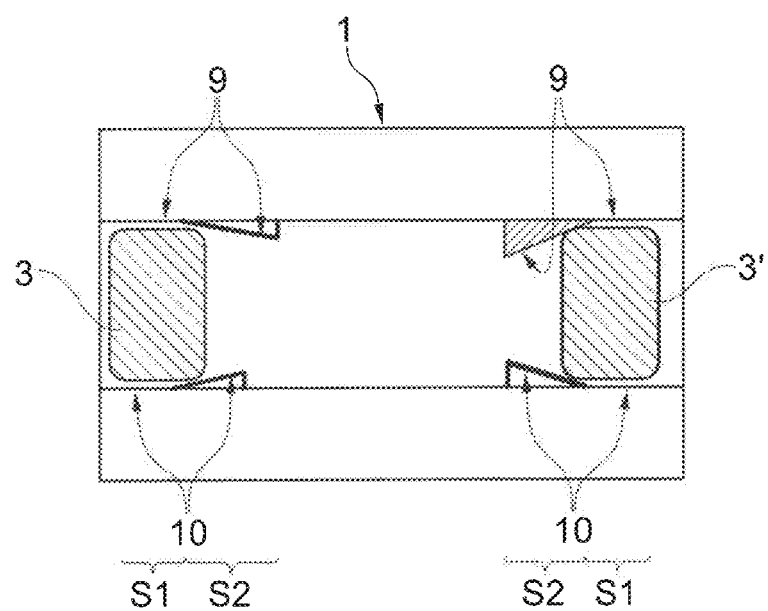
Figure 6A:
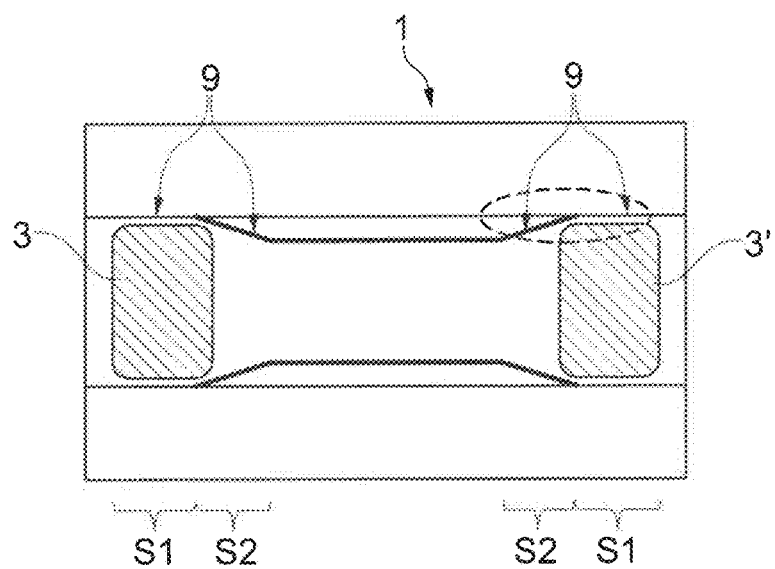
FIG. 6e shows a wall 9 having a reduced thickness in the second section S2, wherein the wall is curved to provide the non-vanishing angle and the reduced distance in the second section S2. Therein, the wall has a downward bend, being concave on the lower side facing the other wall 10.
FIG. 6f shows a wall having a reduced thickness in the second section, wherein the wall is curved to provide the non-vanishing angle and the reduced distance in the second section S2. Therein, the wall has a bend that is convex on the lower side facing the other wall 10.
Figure 6B:
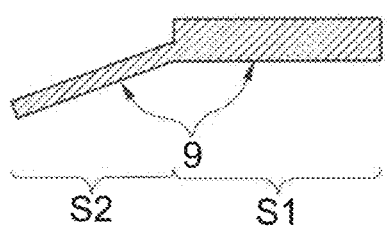
Figure 6E:
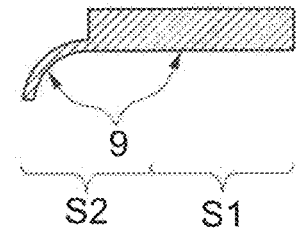
Figure 6C:
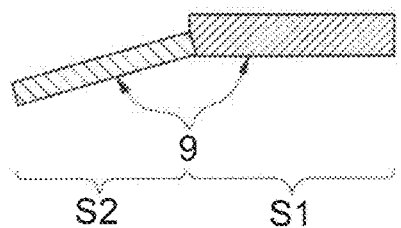
Figure 6F:
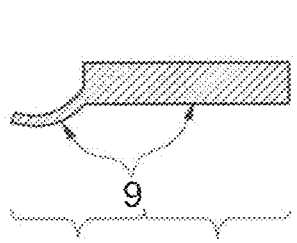
Figure 6D:
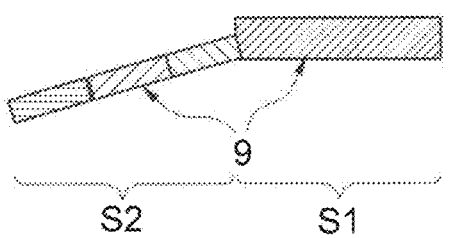
Figure 6G:
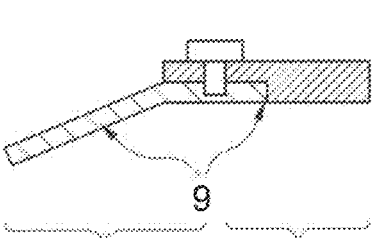

FIG. 6g shows a wall 9 having a reduced thickness in the second section S2, wherein there is a kink between the first section S1 and the second section S2. The second section S2 is formed by a wall portion that is made of a different material than the wall portion of the first section S1. The two different materials are connected to each other by way of a fastening device 13.

LIST OF REFERENCE NUMERALS 1 brake pad spring
2, 2' brake pad
3, 3' backplate
4, 4' friction layer
5 brake disk
6 caliper
7 carrier (caliper bracket)
8 piston
9 first wall (circumferentially outer wall)
10 second wall (circumferentially inner wall)
11, 11' retraction spring
12, 12' sliding face of the brake pad
13 fastening device
A non-braking position
B braking position
S1 first section
S2 second section

The invention claimed is:

1. Brake pad spring for at least one brake pad, wherein the brake pad spring comprises, for each of the at least one brake pad, two opposing walls, configured for receiving a portion of a backplate of the respective brake pad therebetween, and for guiding the respective brake pad between a non-braking position in which the respective brake pad is located at a first section of the opposing walls, and a braking position in which the brake pad is located at a second section of the opposing walls, wherein at least a portion of at least one of the two opposing walls is elastically movable, and wherein the two opposing walls each have an angled portion that protrudes toward each other, and the angled portion has an incline so that a thickness increases from the first section to the second section, in order to create a return spring effect for the respective brake pad, from the braking position towards the non-braking position, wherein the angles of the angled portions formed on the two opposing walls are different.

2. Brake pad spring according to claim 1, wherein the distance between the two opposing walls diminishes by at least 5% and/or at most 15% and/or by least 1 mm or by at least 2 mm and/or by at most 4 mm or by at most 3 mm and/or wherein, at least sectionally, an angle between the two opposing walls is at least 5 degrees and/or at most 8 degrees.

3. Brake pad spring according to claim 1, wherein at least one of the two opposing walls is curved, in order to at least sectionally provide the non-vanishing angle between the two opposing walls.

4. Brake pad spring according to claim 1, wherein the brake pad spring is designed as a stamped and/or bent metal part or wherein the brake pad spring is an additively manufactured part.

5. Brake pad spring according to claim 1, wherein the brake pad spring is a one-piece component.

6. Brake pad spring according to claim 1, wherein the brake pad spring comprises metal and/or wherein the brake pad spring comprises a polymer.

7. Brake pad spring according to claim 1, wherein at least a portion of the two opposing walls that is configured for engaging with the respective brake pad has a coating.

8. Brake pad spring according to claim 1, wherein at least one of the two opposing walls comprises two or more sections having different materials from one another and/or different stiffness from one another.

9. Brake pad spring according to claim 1, wherein, for at least one of the two opposing walls, a wall thickness within the first section is different from a wall thickness within the second section, the wall thickness in the first section being larger or smaller than the wall thickness in the second section.

10. Brake pad spring according to claim 1, wherein the brake pad spring is devoid of a retraction spring.

11. Brake pad spring according to claim 1, wherein diminishing of the distance of the two opposing walls from the first section towards the second section is provided by providing an angle for at least a section of a circumferentially outer wall of the two opposing walls and/or by providing an angle for at least a section of a circumferentially inner wall of the two opposing walls.

12. Brake pad spring according to claim 1, configured for guiding two brake pads, namely an inner brake pad and an outer brake pad, wherein two opposing walls are provided for each of the two brake pads, the two opposing walls configured for receiving a portion of a backplate of the respective brake pad therebetween, and wherein, for the inner brake pad and/or for the outer brake pad, at least a portion of at least one of the two opposing walls is elastically movable and the two opposing walls, at least sectionally, have a non-vanishing angle with respect to each other, a distance between the two opposing walls diminishing from the first section towards the second section, in order to create a return spring effect for the respective brake pad, from the braking position (B) towards the non-braking position.

13. Disk brake system according to claim 1, wherein the angled portion of an upper wall among the two opposing walls has a steeper angled than the angled portion of a lower wall.

14. Disk brake system according to claim 1, wherein the position of the angled portions formed on the two opposing walls are different.

15. Disk brake system according to claim 14, wherein the angled portion of an upper wall among the two opposing walls is positioned further inward toward the second section than the angled portion of a lower wall.

16. Disk brake system, comprising a brake disk and a brake pad spring which is mounted on a carrier,
wherein a portion of a backplate of a brake pad is received between two opposing walls of the brake pad spring, for guiding the brake pad between a non-braking position in which the brake pad is located at a first section of the opposing walls and away from the brake disk, and a braking position in which the brake pad is located at a second section of the opposing walls and wherein the brake pad abuts against the brake disk,
wherein at least a portion of at least one of the two opposing walls is elastically movable, and wherein the two opposing walls each have an angled portion that protrudes toward each other, and the angled portion has an incline so that a thickness increases from the first section to the second section, so that the portion of the back plate that is received between the two opposing walls engages with an angled portion formed in each of the two opposing walls at the second section to create a return spring effect for the brake pad, effecting or aiding movement of the brake pad from the braking position towards the non-braking position,
wherein the angles of the angled portions formed on the two opposing walls are different.

17. Disk brake system according to claim 16, wherein a clearance between the brake disk and a friction layer of the brake pad in the non-braking position is at least 0.05 mm and/or at most 0.12 mm.

* * * * *